United States Patent [19]

Philippe

[11] Patent Number: 4,924,360
[45] Date of Patent: May 8, 1990

[54] MOUNTING AND ADJUSTING APPARATUS FOR AN ILLUMINATING DEVICE, MORE PARTICULARLY A HEADLAMP, ESPECIALLY FOR AN AUTOMOBILE

[75] Inventor: Eric Philippe, Saint Germain en Laye, France

[73] Assignee: Valeo Vision, Bobigny Cedex, France

[21] Appl. No.: 312,052

[22] Filed: Feb. 17, 1989

[30] Foreign Application Priority Data

Feb. 19, 1988 [FR] France ............................. 88 01983

[51] Int. Cl.5 ............................................. B60Q 1/00
[52] U.S. Cl. ..................... 362/61; 362/427; 362/287; 362/289
[58] Field of Search ............... 362/61, 80, 418, 427, 362/285, 287, 289, 306, 430

[56] References Cited

U.S. PATENT DOCUMENTS

| 3,823,314 | 7/1974 | Germany | 362/419 |
| 4,196,459 | 4/1980 | Dick | 362/80 |
| 4,414,614 | 11/1983 | McMahan et al. | 362/80 |
| 4,621,307 | 11/1986 | Weber | 362/80 |
| 4,722,033 | 1/1988 | VanDuyn et al. | |
| 4,747,023 | 5/1988 | Ball et al. | 362/285 |

FOREIGN PATENT DOCUMENTS 2482537 11/1981 France ............................. 315/82

Primary Examiner—Ira S. Lazarus
Assistant Examiner—D. M. Cox
Attorney, Agent, or Firm—Wenderoth, Lind & Ponack

[57] ABSTRACT

A mounting and adjusting apparatus for a headlamp (1) for an automobile includes a support (10) which is fixed to the headlamp (1) and on which is mounted, for free rotation, an adjusting screw (13) which moves the support (10) longitudinally with respect to a carrier (15), which is in resilient engagement against an element (21) of the vehicle body. The support (10) includes a plate having at least one opening (26), which is adapted to engage a corresponding anchoring projection (26) formed on the headlamp (1), and at least one locking tongue (30) whereby the support plate (10) is secured by inserting the locking tongue (30) between an arm (23) of the support plate (10) and a stirrup portion (28) of the headlamp, with the arm (23) located within the stirrup portion.

12 Claims, 2 Drawing Sheets

MOUNTING AND ADJUSTING APPARATUS FOR AN ILLUMINATING DEVICE, MORE PARTICULARLY A HEADLAMP, ESPECIALLY FOR AN AUTOMOBILE

FIELD OF THE INVENTION

This invention is concerned with an apparatus for mounting and adjusting an illuminating device such as a headlamp, and is particularly applicable to the automotive field.

BACKGROUND OF THE INVENTION

A headlamp for a vehicle such as an automobile generally comprises a reflector which is open at the front and which is adapted to have a cover glass fitted over it so as to define with the reflector an enclosed interior space, within which a light source is mounted so that the rays of light from the latter are reflected by the reflector and propagated through th cover glass. In certain cases, the reflector is disposed inside a housing with the cover glass secured over the front opening of the housing.

In both of these cases, the headlamp is provided with some mechanism for adjusting the light beam, by effecting a slight pivoting movement of the reflector with respect to the body of the vehicle, or with respect to the housing within which the reflector is mounted.

U.S. Pat. No. 4 196 459 describes a mechanism for mounting and adjusting a headlamp for an automotive vehicle, in which the mechanism comprises a support which includes a leaf spring fixed to the reflector and having its resilient free end formed with an opening, such as to allow the leaf spring to slide with respect to a carrier, which in turn is in resilient engagement with a part of the bodywork. An adjusting screw is threaded into the carrier, the adjusting screw being such as to move longitudinally with the leaf spring and thus with the reflector.

One of the features disclosed in the above mentioned U.S. Patent is that the leaf spring is fixed on the reflector by rivets. This arrangement has the disadvantage that it gives rise to local impairment in the quality of the light beam emitted by the headlamp, due to the presence of the heads of the rivets which lie on the reflecting surface of the reflector.

SUMMARY OF THE INVENTION

An object of the invention is to provide an apparatus for mounting and adjusting an illuminating device which is dismountable and which does not affect the quality of the light beam.

According to the invention, there is provided a mounting and adjusting mechanism for an illuminating device, more particularly a headlamp, especially for an automotive vehicle, of the type having a support fixed to the illuminating device and having, mounted for free rotation thereon, an adjusting screw which is arranged to move the support mechanism longitudinally with respect to a fixed carrier in resilient engagement against an element of the bodywork of the vehicle. The mounting and adjusting mechanism is characterized in that the support mechanism comprises a plate having at least one opening formed therein and adapted to engage a corresponding anchoring projection which is fixed with respect to the illuminating device. At least one locking tongue secures the support plate against movement, the locking tongue being inserted between an arm of the support plate and a stirrup portion of the illuminating device, the arm being located in the stirrup portion.

The description which follows, with reference to the accompanying drawings, will afford a better understanding of how the invention may be put into practice.

DESCRIPTION OF A PREFERRED EMBODIMENT

Figure 1:
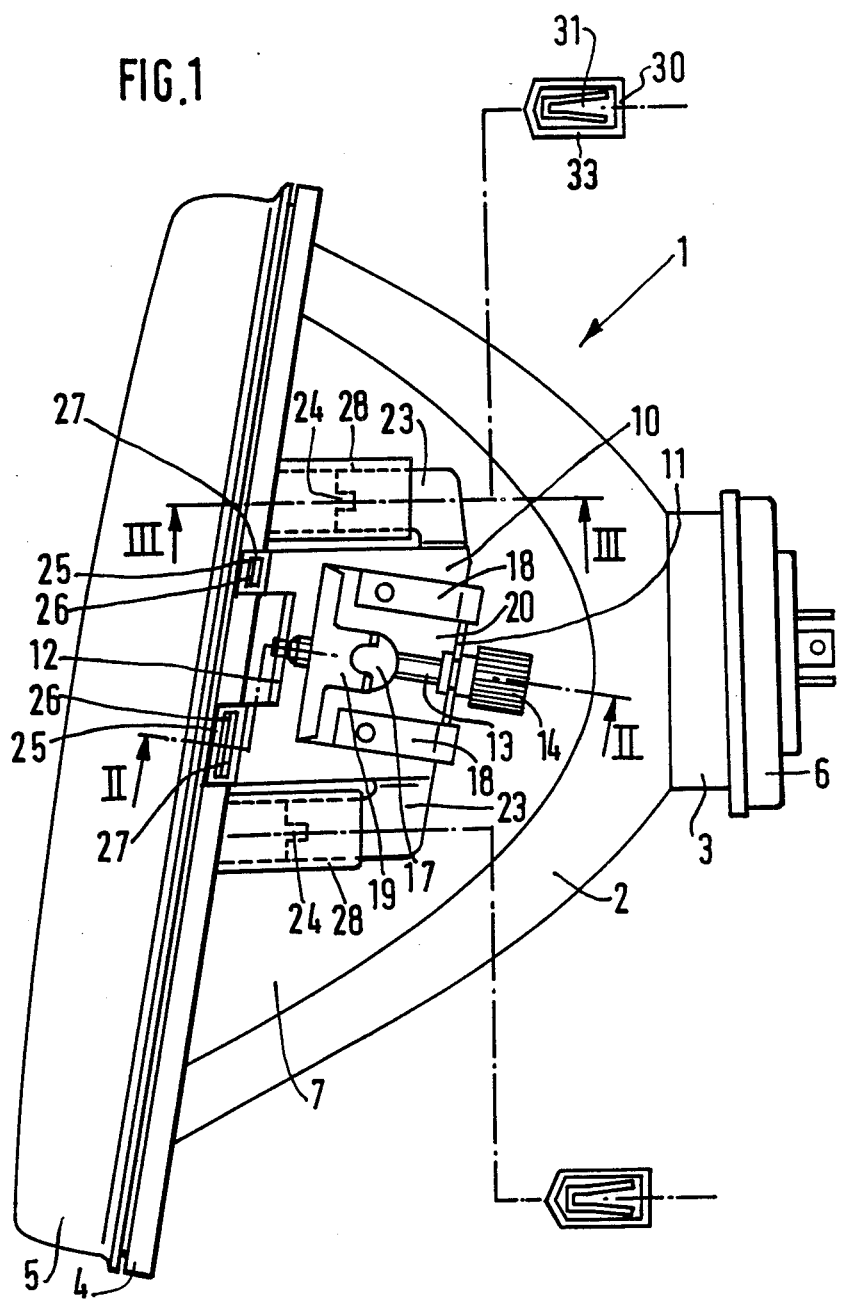
FIG. 1 shows, in elevation, a headlamp having a mounting and adjusting mechanism arranged according to the invention.

The headlamp 1 shown in FIG. 1 includes a reflector 2 which is made by moulding a plastics material. The reflector 2 has a rearward opening 3 and a front opening 4. A cover glass 5 is fixed over the front opening 4 so as to define an enclosed interior space within the reflector. A cap 6 is fixed over the rearward opening 3 and includes a suitable securing arrangement. A set of terminals, for the electrical connection of a lamp situated in the enclosed space within the reflector 2, pass through the cap 6.

A flat surface 7 is formed on the reflector 2, and mechanisms for mounting and adjusting the headlamps 1 are provided on this flat surface.

Figure 2:
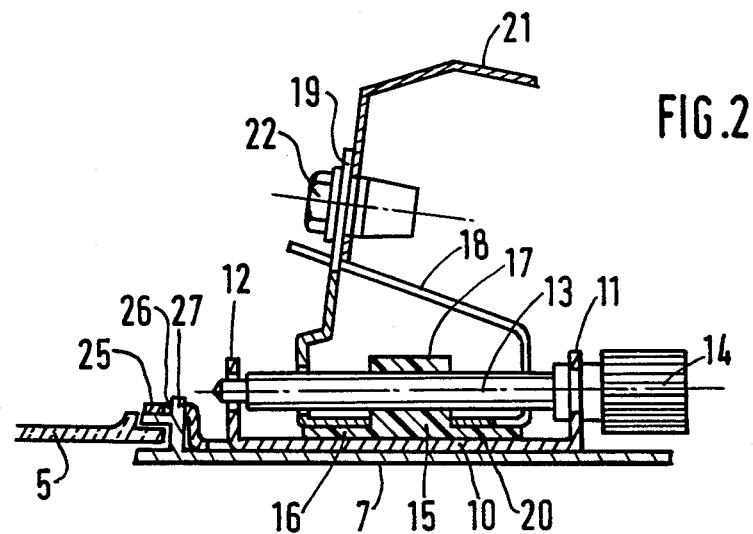
FIG. 2 shows on a larger scale a cross-section taken on the line II—II in FIG. 1.
Figure 3:
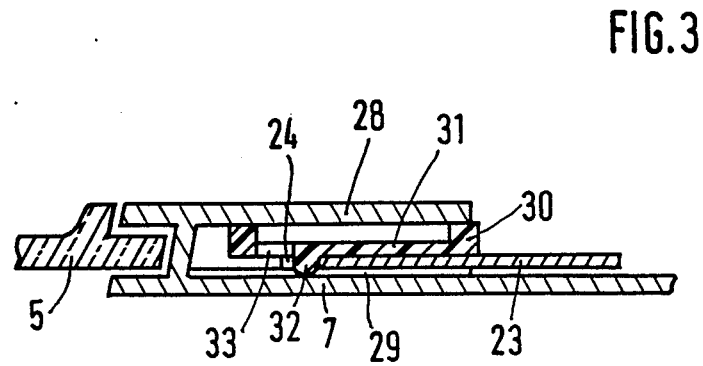
FIG. 3 shows, on a larger scale still, a cross-section on line III—III in FIG. 1.

Referring now to both of FIGS. 1 and 2, these mounting and adjusting mechanisms include a support plate 10, formed by pressing from a metal sheet. The support plate 10 has two opposed flanges 11 and 12 which are bent vertically upward as seen in FIG. 2. The flange 12 is formed with a through hole to accommodate, for free rotation therein, the end of an adjusting screw 13. The other flange 11 has an opening for locating and accommodating the other end of the adjusting screw 13, which has a knurled head 14 at this latter end for turning by hand. A carrier 15 is fixed with respect to the body of the vehicle, as will be seen later herein. The carrier 15 comprises, all integral with each other, a foot portion 16 which is in sliding contact on the support plate 10, and a threaded female portion 17 through which the adjusting screw 13 extends, so that the action of the latter moves the support plate 10 back and forth. The headlamp 1 is thereby moved during adjustment. A member 20, comprising two leaf springs 18 and a fork 19 and formed by pressing from a sheet of spring steel, is fixed on the carrier 15.

The assembly of the carrier 15, screw 13 and spring member 20 is fixed on to the flat portion 7 of the reflector 2 of the headlamp 1 by means of the support plate 10. The support plate 10 has two anchor lugs 25, which are formed by bending and cutting in locations flanking the respective ends of the flange 12. Each anchor lug 25 has a hole 26 for anchoring it on a vertical tab 27, which is moulded integrally with the reflector 2. Two arms 23 are also formed by cutting and bending and extend, parallel to each other, from each side of the support plate 10 towards the front of the headlamp 1. Each of the arms 23 is bent in such a way that it is situated in a horizontal plane slightly above the support plate 10 (as seen in FIG. 2), and has a recess 24 formed in its free end.

Two stirrup or slot portions 28, each in the form of a bridge, are made by moulding the integrally with the reflector 2 on its flat portion 7. Each stirrup portion 28 has on its lower wall two rails 29, the thickness of which is equal to the width of the gap between the corresponding arm 23 and the support plate 10.

The support plate 10, carrying the carrier 15, the adjusting screw 13, and the member 20 including leaf springs 18 and fork 19, is mounted on to the flat portion 7 of the reflector 2 by engaging the arms 23 into the stirrup portions 28, while bringing the arms 23 into contact with the upper walls of the stirrup portions 28, until the holes 26 formed in the anchor lugs 25 snap into engagement on the tabs 27. The support plate 10 is then brought into contact with the reflector 2, with the arms 23 lying on the rails 29. Two locking tongues 30 are formed by moulding in plastics material. Each locking tongue 30 comprises a rectangular portion 33 surrounding a resilient finger 31 of the tongue 30, the finger 31 having at its end a pin portion 32. Each locking tongue 30 is inserted in a respective one of the stirrup portions 28 between the arm 23 and the upper wall of the stirrup portion 28, until the pin portion 32 of the resilient finger 31 comes into engagement in the recess 24, by virtue of the slight super-elevation of the arms 23 with respect to the lower wall of the stirrup portion 28.

It should be noted that, in order to position the support plate 10 before it is secured, the anchor lugs 25 should pass over the tabs 27 before being anchored. To this end, the arms 23 are inserted into the stirrup portions 28 by bringing the arms into contact with the upper walls of the stirrup portions 28, the height of which should be substantially the same as the thickness of a locking tongue 30 added to the thickness of the arm 23. In consequence, the height of the tabs 27 should be less than the thickness of the locking tongue 30.

The headlamp 1 is mounted on the vehicle by a fixing mechanism at its lower portion, comprising for example a projecting element engaging on a pad fixed on a part of the bodywork such as to allow angular movement to take place. The pin projecting element is maintained by pressure in engagement on the pad. In the upper part of the headlamp, the fork 19 embraces a screw 22, which is itself fixed on an element 21 of the bodywork. The leaf spring 18 themselves bear on the element 21, so that the leaf springs maintain on the headlamp 1 such pressure as is necessary for securing the latter in position. The screw 22 provides the initial positioning of the headlamp 1.

Adjustment of the headlamp 1 is then carried out in the following manner. The adjusting screw 13 is rotated by means of its knurled head 14. The carrier 15, on which the leaf springs 18 and fork 19 are fixed, and which is itself fixed with respect to the bodywork element 21, is of course stationary.

During its rotation, the adjusting screw 13 moves axially with respect to the carrier 15, carrying with it the support plate 10 with which it is coupled for axial movement. Since the support plate 10 is fixed on the reflector of the headlamp 1, the latter thus tilts about its axis of rotation with respect to the body of the vehicle, in a range of angular movement which is limited by the length of the adjusting screw 13.

It will be clear that the above description relates to only one possible embodiment, and that numerous modifications may be made to it without in any way departing from the scope of the invention.

What is claimed is:

1. An apparatus for mounting and adjusting a headlamp of a vehicle, said apparatus comprising:
   an adjustment support plate connected to the headlamp;
   a carrier for connection to the body of the vehicle, said carrier having a foot portion adjacent to and in sliding contact with said support plate and a threaded female portion;
   a spring member fixed on said carrier and adapted to be connected to the body of the vehicle so as to bias said carrier against said support plate; and
   an adjusting screw extending through said threaded female portion of said carrier, said adjusting screw mounted freely rotatable but translatably fixed with respect to said support plate, whereby rotation of said adjusting screw in said threaded female portion of said carrier causes said support plate to translate relative to said carrier to adjust said headlamp.

2. The apparatus as set forth in claim 1 wherein:
   said headlamp has means forming at least one slot; and
   said support plate has at least one projecting arm located in said at least one slot.

3. The apparatus as set forth in claim 2, wherein said headlamp includes two said slots and said support plate has two said projecting arms, each said projecting arm located in a respective said slot.

4. The apparatus as set forth in claim 2, wherein:
   each said slot and each said projecting arm located therein has a locking tongue therebetween for securing said support plte against inadvertent movement relative to said headlamp.

5. The apparatus as set forth in claim 4, wherein:
   each said slot and said headlamp are made of the same material, each said slot having a height substantially equal to the thickness of a said projecting arm plus the thickness of a said locking tongue.

6. The apparatus as set forth in claim 5, wherein:
   each said projecting arm of said support plate has a recess therein; and
   each said locking tongue comprises a resilient finger having a pin portion for disposition within a respective said recess.

7. The apparatus as set forth in claim 4, wherein:
   said headlamp further comprise at least one fixed anchoring projection for anchoring said support plate, said at least one anchoring projection having a height less than the thickness of a said locking tongue; and
   said support plate further has at least one anchor lug having a hole therethrough for engagement with said at least one fixed anchoring projection.

8. The apparatus as set forth in claim 7, wherein:
   each said anchoring projection comprises a tab integrally moulded with said headlamp and disposed so as to extend in a substantially vertical plane.

9. The apparatus as set forth in claim 4, wherein said headlamp comprises two said slots and said support plate has two said projecting arms, each said projecting arm located in a respective said slot and secured by a respective said locking tongue.

10. The apparatus as set forth in claim 1, wherein:
    said support plate has one side thereof in contact with said headlamp, and said foot portion of said carrier is in sliding contact with the opposite side of said support plate.

11. The apparatus as set forth in claim 1, wherein:

said spring member comprises a pair of leaf springs and a forked connecting portion for connection to the body of the vehicle.

12. An apparatus for mounting and adjusting a headlamp of a vehicle, said apparatus comprising:
   an adjustment support plate connected to the headlamp;
   a carrier having a foot portion adjacent to and in sliding contact with said support plate and a threaded female portion;
   a spring member fixed on said carrier and connected to the vehicle body so as to bias said carrier against said support plate; and
   an adjusting screw extending through said threaded female portion of said carrier, said adjusting screw mounted rotatably free but translatably fixed with respect to said support plate, whereby rotation of said adjusting screw in said threaded female portion of said carrier causes said support plate to translate relative to said carrier to adjust said headlamp.

* * * * *